(12) United States Patent
Grandou et al.

(10) Patent No.: US 7,761,665 B2
(45) Date of Patent: Jul. 20, 2010

(54) HANDLING OF CACHE ACCESSES IN A DATA PROCESSING APPARATUS

(75) Inventors: Gilles Eric Grandou, Plascassier (FR); Philippe Jean-Pierre Raphalen, Valbonne (FR)

(73) Assignee: ARM Limited, Cambridge (GB)

( * ) Notice: Subject to any disclaimer, the term of this patent is extended or adjusted under 35 U.S.C. 154(b) by 1034 days.

(21) Appl. No.: 11/134,513

(22) Filed: May 23, 2005

(65) Prior Publication Data

US 2006/0265551 A1    Nov. 23, 2006

(51) Int. Cl.
*G06F 12/00*    (2006.01)
(52) U.S. Cl. .................. 711/128; 711/118; 711/130; 711/133; 711/135; 711/136; 711/141; 711/144; 711/146; 711/125; 711/126
(58) Field of Classification Search .............. 711/118, 711/123, 125, 126, 128
See application file for complete search history.

(56) References Cited

U.S. PATENT DOCUMENTS

| 5,802,602 | A | * | 9/1998 | Rahman et al. | ............. | 711/204 |
| 6,332,179 | B1 | * | 12/2001 | Okpisz et al. | ............. | 711/140 |
| 2002/0161976 | A1 | * | 10/2002 | Ito et al. | ............. | 711/128 |
| 2004/0024968 | A1 | * | 2/2004 | Lesartre et al. | ............. | 711/128 |

(Continued)

OTHER PUBLICATIONS

Zhang et al. at San Diego State University, A Way-Halting Cache for Low-Energy High-performance System, Mar. 2005; ACM Transactions on Architecture and Code Optimization vol. 2, No. 1 pp. 34-35.*

(Continued)

*Primary Examiner*—Tuan V Thai
*Assistant Examiner*—Zhuo H Li
(74) *Attorney, Agent, or Firm*—Nixon & Vanderhye P.C.

(57) ABSTRACT

The present invention provides a data processing apparatus and method for handling cache accesses. The data processing apparatus comprises a processing unit operable to issue a series of access requests, each access request having associated therewith an address of a data value to be accessed. Further, the data processing apparatus has an n-way set associative cache memory operable to store data values for access by the processing unit, each way of the cache memory comprising a plurality of cache lines, and each cache line being operable to store a plurality of data values. The cache memory further comprises for each way a TAG storage for storing, for each cache line of that way, a corresponding TAG value. The cache memory is operable, when the processing unit is issuing access requests specifying data values held sequentially in a cache line of a current way of the cache memory, to perform a speculative lookup in at least one TAG storage to determine whether the TAG value associated with the next cache line in one way associated with the at least one TAG storage equals an expected tag value. If that TAG value does equal the expected tag value, and following an access request identifying a last data value in the cache line of the current way, a further access request is issued identifying the next cache line, then the cache memory is operable, without further reference to any TAG storage of the cache memory, to access from that next cache line of the one way the data value the subject of the further access request. This provides significant power savings when handling accesses to a cache memory.

11 Claims, 9 Drawing Sheets

U.S. PATENT DOCUMENTS

2004/0030838 A1* 2/2004 van de Waerdt ............. 711/137

OTHER PUBLICATIONS

Lebeck et al., *Power Aware Page Allocation*, Department of Computer Science, Duke University, 2000, 28 pages of PowerPoint.

Calder, et al., *Predictive Sequential Associative Cache*, paper presented at the 2$^{nd}$ International Symposium on High Performance Computer Architecture, San Jose, CA., Feb. 1996, 10 pages.

Kim et al., Energy-Efficient Instruction Cache Using Page-Based Placement, *CASES'01*, Nov. 16-17, 2001, Atlanta, GA, USA, 9 pages.

Batson et al., Reactive-Associative Caches, *PACT'01*, 2001 IEEE, 12 pages.

Powell et al., Reducing Set-Associative Cache Energy via Way-Prediction and Selective Direct-Mapping, *MICRO 34*, 2001, 12 pages.

* cited by examiner

| lookup | 00 | 01 | 02 | 03 | 04 | 05 | 06 | 07 | 08 | 09 | 0a | 0b | 0c |
|---|---|---|---|---|---|---|---|---|---|---|---|---|---|
| index |  |  |  |  |  |  |  |  |  |  |  |  |  |
| TAG0 | n | n | n | n | n | n | n | n | n+1 | n+1 | n+1 | n+1 | n+1 |
| TAG1 | 1 | 1 | 1 | 1 | 1 | 1 | 1 | 1 | 1 | 1 |  |  |  |
| TAG2 | 1 | 1 | 1 | 1 | 1 | 1 | 1 | 1 | 1 | 1 |  |  |  |
| TAG3 | 1 | 1 | 1 | 1 | 1 | 1 | 1 | 1 | 1 | 1 |  |  |  |
| index |  |  |  |  |  |  |  |  |  |  |  |  |  |
| DATA0 | n | n | n | n | n | n | n | n | n+1 | n+1 | n+1 | n+1 | n+1 |
| DATA1 | 1 | 1 | 1 | 1 | 1 | 1 | 1 | 1 | 1 | 1 | 1 | 1 | 1 |
| DATA2 | 1 | 1 | 1 | 1 | 1 | 1 | 1 | 1 | 1 | 1 | 1 | 1 | 1 |
| DATA3 | 1 | 1 | 1 | 1 | 1 | 1 | 1 | 1 | 1 | 1 | 1 | 1 | 1 |
| current way | ? | ? | 2 | 2 | 2 | 2 | 2 | 2 | ? | ? | 2 | 2 | 2 |

RAM cost of crossing the line is $(4.T + 8.D)$

Fig. 7A

| lookup | 00 | 01 | 02 | 03 | 04 | 05 | 06 | 07 | 08 | 09 | 0a | 0b | 0c |
|---|---|---|---|---|---|---|---|---|---|---|---|---|---|
| index | | | | | | | n+1 | | | | | | |
| TAG0 | n | n | | | | | | | | | | | |
| TAG1 | 1 | 1 | | | | | | | | | | | |
| TAG2 | 1 | 1 | | | | | 1 | | | | | | |
| TAG3 | 1 | 1 | | | | | | | | | | | |
| index | | | | | | | | | | | | | |
| DATA0 | n | n | n | n | n | n | n | n | n+1 | n+1 | n+1 | n+1 | n+1 |
| DATA1 | 1 | 1 | 1 | 1 | 1 | 1 | 1 | 1 | 1 | 1 | 1 | 1 | 1 |
| DATA2 | 1 | 1 | 2 | 2 | 2 | 2 | 2 | 2 | 2 | 2 | 2 | 2 | 2 |
| DATA3 | 1 | 1 | | | | | | | | | | | |
| current way | ? | ? | ? | 2 | 2 | 2 | 2 | 2 | 2 | 2 | 2 | 2 | 2 |

RAM cost of crossing the line is (1.T + 1.D)

Fig. 7B

| lookup | 00 | 01 | 02 | 03 | 04 | 05 | 06 | 07 | 08 | 09 | 0a | 0b | 0c |
|---|---|---|---|---|---|---|---|---|---|---|---|---|---|
| index |  |  |  |  |  |  |  |  |  |  |  |  |  |
| TAG0 | n |  |  |  |  |  | n+1 |  | n+1 |  |  |  |  |
| TAG1 | 1 | 1 |  |  |  |  |  |  | 1 |  |  |  |  |
| TAG2 | 1 | 1 |  |  |  |  | 1 |  | 1 |  |  |  |  |
| TAG3 | 1 | 1 |  |  |  |  |  |  |  |  |  |  |  |
| index |  |  |  |  |  |  |  |  |  |  |  |  |  |
| DATA0 | n | n | n | n | n | n | n | n | n+1 | n+1 | n+1 | n+1 | n+1 |
| DATA1 | 1 | 1 | 1 | 1 | 1 | 1 | 1 | 1 | 1 | 1 | 1 | 1 | 1 |
| DATA2 |  | 1 | 1 | 1 | 1 | 1 | 1 | 1 | 1 | 1 |  |  |  |
| DATA3 |  | 1 |  |  |  |  |  |  |  | 1 |  |  |  |
| current way | ? | ? | 2 | 2 | 2 | 2 | 2 | 2 | ? | ? | 0 | 0 | 0 |

RAM cost of crossing the line is (4.T + 6.D)
we still save 2 data lookups compared to the first case.

Fig. 7C

HANDLING OF CACHE ACCESSES IN A DATA PROCESSING APPARATUS

TECHNICAL FIELD

The present invention relates to techniques for handling accesses to a cache memory (also referred to herein as a cache) in a data processing apparatus.

BACKGROUND

A cache may be arranged to store data and/or instructions fetched from a memory so that they are subsequently readily accessible by a processor. Hereafter, unless otherwise apparent from the context, the term "data value" will be used to refer to both instructions and data. The cache will store the data value until it is overwritten by a data value for a new location required by the processor. The data value is stored in cache using either physical or virtual memory locations. Should the data value in the cache have been altered then it is usual to ensure that the altered data value is re-written to the memory, either at the time the data is altered or when the data value in the cache is overwritten.

One type of cache is an n-way set associative cache. Each way of the cache comprises a data memory having a plurality of cache lines, each cache line being operable to store a plurality of data values. In addition to the data memory, there is also provided a TAG memory. For each cache line within the data memory, there is provided a corresponding entry within the TAG memory.

Each access request issued by a processor for access to a data value will typically identify an address associated with that data value and that address will include a TAG portion and a set portion. The set portion of the address is used to identify a particular set within the cache. Each set within an n-way set associative cache consists of a single cache line in each of the ways, and hence, by way of illustration, a four way set associative cache will have four cache lines in each set. This means that for a particular data value, there are n possible cache lines in which that cache value can be stored within an n-way set associative cache, namely one cache line in each way.

The data values stored within any particular cache line will share a common TAG portion of their address, and that TAG portion is stored within the associated entry of the TAG memory. Furthermore, all of the data values in a particular cache line relate to a sequence of adjacent data values in memory.

Accordingly, when the processor issues a sequential access request, i.e. an access request in which the address follows a predetermined incremental relationship to the address of the immediately preceding access request, and a hit occurred in a particular way of the cache for that immediately preceding access request, then it is guaranteed that the data value the subject of the current access request will also be found in the same way of the cache, provided that the data value the subject of the immediately preceding access request was not the last data value in a cache line. Thus, for such sequential accesses, it is not necessary to perform any lookup in the TAG memories in order to identify a TAG value matching the TAG portion of the address contained in the access request, since it is already known which way the data value will be found in. Furthermore, it is only necessary to access the data memory of that particular way in order to access that required data value the subject of the sequential access request. Hence, the handling of such a sequential access request within the cache is very power efficient since it is only necessary to access one of the data memories.

This should be contrasted with a non-sequential access, i.e. an access request whose address is not related to that of the immediately preceding access request. For a non-sequential access it is necessary to perform a lookup in each of the TAG memories, and at the same time perform a lookup in each of the data memories, using the set portion of the address as an index into the TAG memory and data memory of each way. If a match is found between the TAG portion of the address of the access request and a TAG value held in one of the TAG memories then the data value is accessed from the corresponding data memory. Hence, for an n-way set associative cache, it can be seen that n TAG memories and n data memories need to be accessed, which represents a significant power cost.

Furthermore, for an access request that is sequential, but relates to an address that is crossing a cache line boundary, the way information pertaining to the immediately preceding access request is no longer valid, and instead the access request has to be treated as non-sequential. Accordingly, in such instances, such a sequential access actually incurs the same power consumption within the cache as a standard non-sequential access.

It is generally desirable to reduce the power consumption of the cache, since this will increase the amount of time that a data processing apparatus including such a cache can be run on battery power, and further will reduce the heat dissipation requirements of the data processing apparatus.

SUMMARY

Viewed from a first aspect, the present invention provides a data processing apparatus comprising: a processing unit operable to issue a series of access requests, each access request having associated therewith an address of a data value to be accessed; an n-way set associative cache memory operable to store data values for access by the processing unit, each way of the cache memory comprising a plurality of cache lines, each cache line being operable to store a plurality of data values, the cache memory further comprising for each way a tag storage operable to store, for each cache line of that way, a corresponding tag value, the tag value being derived from a portion of the address common to each data value held in that cache line; the cache memory being operable, when the processing unit is issuing access requests specifying data values held sequentially in a cache line of a current way of the cache memory, to perform a speculative lookup in at least one tag storage to determine whether the tag value associated with a next cache line in one way associated with the at least one tag storage equals an expected tag value; if that tag value does equal the expected tag value, and following an access request identifying a last data value in said cache line of said current way, a further access request is issued identifying the next cache line, then the cache memory is operable, without further reference to any tag storage of the cache memory, to access from that next cache line of said one way the data value the subject of the further access request.

In accordance with the present invention, the cache memory is operable, at some predetermined point when a sequential access is being performed in a particular cache line of a current way, to perform a speculative lookup in at least one TAG storage of the n-way set associative cache memory in order to determine whether the TAG value associated with a next cache line in one way associated with that at least one TAG storage equals an expected TAG value. The expected TAG value is that which would need to be associated with a next cache line in order to enable a hit to occur within that cache line for a subsequently issued access request that is sequential but relates to an address that is crossing a cache line boundary. In one embodiment the expected TAG value will be the current TAG value at the time the speculative lookup is being performed (for embodiments where a sequential access has to be constrained to be within the same tag region). Alternatively the expected TAG value could be the tag value of the line following the line currently being accessed (for embodiments where sequential accesses can span tag boundaries).

This speculative lookup is performed at a point such that the result of the speculative lookup is available by the time an access following an access to a last data value in the cache line of the current way takes place. More particularly, if following an access request identifying a last data value in the cache line of the current way, a further access request is issued identifying the next cache line, then the result of the speculative lookup is used to determine whether a power saving can be realised. When a further access request identifies the next cache line, this will be indicated by the set portion of the address being an incremented version of the set portion found in the immediately preceding access request.

If the result of the speculative lookup indicates that the TAG value associated with a next cache line in one way does equal the expected TAG value, then in such a situation the cache memory is operable, without further reference to any TAG storage of the cache memory, to access from that next cache line of said one way the data value the subject of the further access request. Hence, at this point it is only necessary to access a single data memory, whereas previously it would have been necessary to access all of the n data memories of the n-way set associative cache memory. Hence, in the event that the speculative lookup determines a match between the TAG value of the next cache line and the expected TAG value, then there is a power saving realised which is at least equivalent to the power consumed in accessing n-1 data memories.

It should be noted that there is also the possibility of realising a saving with regards to the power consumed in accessing the TAG memories, dependent upon how many TAG memories are accessed as part of the speculative lookup procedure.

The processing unit that issues the series of access requests may take a variety of forms. Hence, by way of example, the processing unit may be a processor core, or may be a prefetch unit provided within the data processing apparatus.

In one particular embodiment the cache memory is operable to perform the speculative lookup in one tag storage, that tag storage being associated with the current way, in order to determine whether the tag value associated with a next cache line in the current way equals the expected tag value. If that tag value does equal the expected tag value, and following an access request identifying a last data value in said cache line of said current way, a further access request is issued identifying the next cache line, then the cache memory is operable, without further reference to any tag storage of the cache memory, to access from that next cache line of said current way the data value the subject of the further access request.

Hence, in this particular embodiment, the speculative lookup is restricted to the current way, and hence the power consumed in performing the speculative lookup equates to the power consumption required for a single TAG memory lookup. Accordingly, it will be appreciated that if the result of such a speculative lookup indicates that the TAG value associated with a next cache line in the current way does equal the expected TAG value, and following an access request identifying a last data value in the cache line of the current way, a further access request is issued identifying the next cache line, then the total power consumption cost for handling the further access request is merely the power consumption for accessing one TAG memory and one data memory. Hence, this is the power consumption that is associated with a sequential access crossing a cache line, which it will be appreciated is significantly reduced when compared with the known prior art technique, where such an access is treated as a non-sequential access.

In one embodiment, if on performing the speculative lookup it is determined that the tag value associated with a next cache line in said current way does not equal the expected tag value, and if following an access request identifying a last data value in said cache line of said current way, a further access request is issued identifying the next cache line, then the cache memory is operable to process the further access request by determining whether the data value the subject of the further access request is in any way of the cache memory other than said current way.

Hence it can be seen that there is even a power consumption saving if the speculative lookup determines that the TAG value associated with the next cache line in the current way does not equal the expected tag value. In that instance, it will be necessary to treat the further access request identifying the next cache line as a non-sequential access, but since the current way has already been excluded from consideration by way of the speculative lookup, it is then only necessary to perform n-1 TAG memory lookups and n-1 data memory lookups in that particular clock cycle. Hence, even considering the power consumed by the earlier speculative lookup, it will be appreciated that there is a saving in power consumption when compared with the typical prior art non-sequential access, this saving being equivalent to the power consumed for one data storage lookup.

The time at which the speculative lookup is performed can be varied depending on the implementation. In one embodiment the cache memory is operable to perform said speculative lookup at the time a sequential access is made to a data value at a predetermined location within said cache line of said current way. In one particular example, there is a two cycle latency in performing a TAG memory lookup, and the predetermined location is the location of the penultimate data value of the cache line. By such an approach it is hence ensured that the result of the speculative lookup is available by the time it is required to perform an access request identifying the next cache line.

It will be appreciated that the above-described techniques of embodiments of the present invention can realise power savings irrespective of the cache allocation policy being used by the cache memory. However, in one embodiment the power savings are further enhanced by arranging the cache memory to adopt a cache allocation policy that seeks to allocate data values having the same TAG value to cache lines in a single way of the cache memory. This hence improves the likelihood that the speculative lookup will determine that the TAG value associated with a next cache line in the current way does equal the expected tag value.

In one particular embodiment, each set of the cache memory comprises one cache line from each way, for any address there being one set in the cache memory within which the associated data value may reside, the cache allocation policy adopted by the cache memory being operable to seek to allocate data values having the same tag value and relating to different sets to related cache lines in said single way of the cache memory.

In one embodiment, the cache allocation policy adopted by the cache memory is operable to seek to allocate data values having different tag values to cache lines in different ways of the cache memory.

The techniques of embodiments of the present invention may be used for caches that store data values in the form of data processed by the processing unit, (hereafter such caches being referred to as data caches), or caches that store data values in the form of instructions to be executed on the processing unit (such caches being referred to hereafter as instruction caches). Indeed, the techniques can also be employed in caches that store both instructions and data (hereafter referred to as unified caches). However, in one particular embodiment, the cache is an instruction cache and each data value represents an instruction. It has been found that for instruction caches, the nature of lookups is such that the lookups are widely sequential, since the processing unit often executes a continuous instruction stream, and the lookups are also usually local (due to the execution of instruction loops within the processing unit). Given such properties it has been found that the techniques of embodiments of the present invention can be particularly beneficial in reducing power consumption, since a stream of sequential accesses will often cross cache lines, thereby enabling frequent power consumption savings to be made when utilising the techniques of embodiments of the present invention.

Viewed from a second aspect the present invention provides a data processing apparatus comprising: processing means for issuing a series of access requests, each access request having associated therewith an address of a data value to be accessed; n-way set associative cache means for storing data values for access by the processing means, each way of the cache means comprising a plurality of cache lines, each cache line for storing a plurality of data values, the cache means further comprising for each way a tag storage means for storing, for each cache line of that way, a corresponding tag value, the tag value being derived from a portion of the address common to each data value held in that cache line; the cache means being arranged, when the processing means is issuing access requests specifying data values held sequentially in a cache line of a current way of the cache means, to perform a speculative lookup in at least one tag storage means to determine whether the tag value associated with a next cache line in one way associated with the at least one tag storage means equals an expected tag value; if that tag value does equal the expected tag value, and following an access request identifying a last data value in said cache line of said current way, a further access request is issued identifying the next cache line, then the cache means is arranged, without further reference to any tag storage means of the cache means, to access from that next cache line of said one way the data value the subject of the further access request.

Viewed from a third aspect the present invention provides a method of handling cache accesses in a data processing apparatus, the data processing apparatus comprising a processing unit operable to issue a series of access requests, each access request having associated therewith an address of a data value to be accessed, and an n-way set associative cache memory operable to store data values for access by the processing unit, each way of the cache memory comprising a plurality of cache lines, each cache line being operable to store a plurality of data values, the cache memory further comprising for each way a tag storage operable to store, for each cache line of that way, a corresponding tag value, the tag value being derived from a portion of the address common to each data value held in that cache line, the method comprising the steps of: when the processing unit is issuing access requests specifying data values held sequentially in a cache line of a current way of the cache memory, performing a speculative lookup in at least one tag storage to determine whether the tag value associated with a next cache line in one way associated with the at least one tag storage equals an expected tag value; if that tag value does equal the expected tag value, and following an access request identifying a last data value in said cache line of said current way, a further access request is issued identifying the next cache line, then, without further reference to any tag storage of the cache memory, accessing from that next cache line of said one way the data value the subject of the further access request.

DETAILED DESCRIPTION

Figure 1:
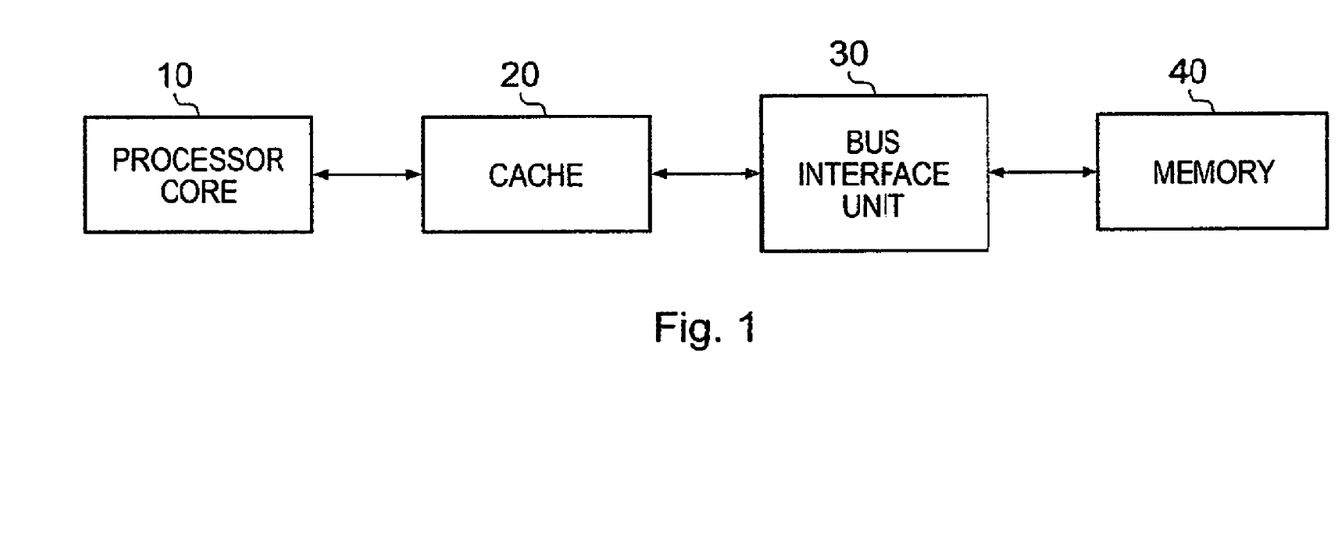
FIG. 1 is a block diagram of a data processing apparatus in accordance with one embodiment.

FIG. 1 is a block diagram of a data processing apparatus in accordance with one example embodiment. In accordance with this embodiment, a processing unit, more particularly in this example a processor core 10, is provided for carrying out data processing operations. A memory 40 is provided for storing data values for access by the processor core 10 during the performance of such data processing operations. Such data values may be instructions for execution by the processor core 10 or data processed during execution of those instructions.

A cache 20 is provided between the processor core 10 and the memory 40 with the aim of improving speed of access to data values by the processor core 10. The cache 20 may be a unified cache for storing both instructions and data, or alternatively the cache 20 may actually comprise two separate caches, namely an instruction cache and a data cache. Cache memories are small, high-speed buffer memories, which are typically arranged to contain the most recently used portions of main memory 40.

When an access request is issued by the processor core 10, a lookup is first performed within the cache 20 to determine whether the data value to be accessed is present within the cache. If so, the data value is accessed within the cache and hence for a write access the accessed data value can be updated within the cache 20, whilst for a read access the required data value can be returned to the processor core 10 from the cache 20.

In the event of a miss within the cache 20 then the access request is propagated onto memory 40 via the bus interface unit 30, to cause the data value to be accessed in main memory.

In FIG. 1, the paths illustrated between the processor core 10, the cache 20, and the bus interface unit 30 are those paths appropriate for cacheable access requests. As will be appreciated by those skilled in the art, certain access requests can also be specified as being non-cacheable, in which event those access requests will be propagated directly form the processor core 10 to the main memory 40 via the bus interface unit 30.

Figure 2:
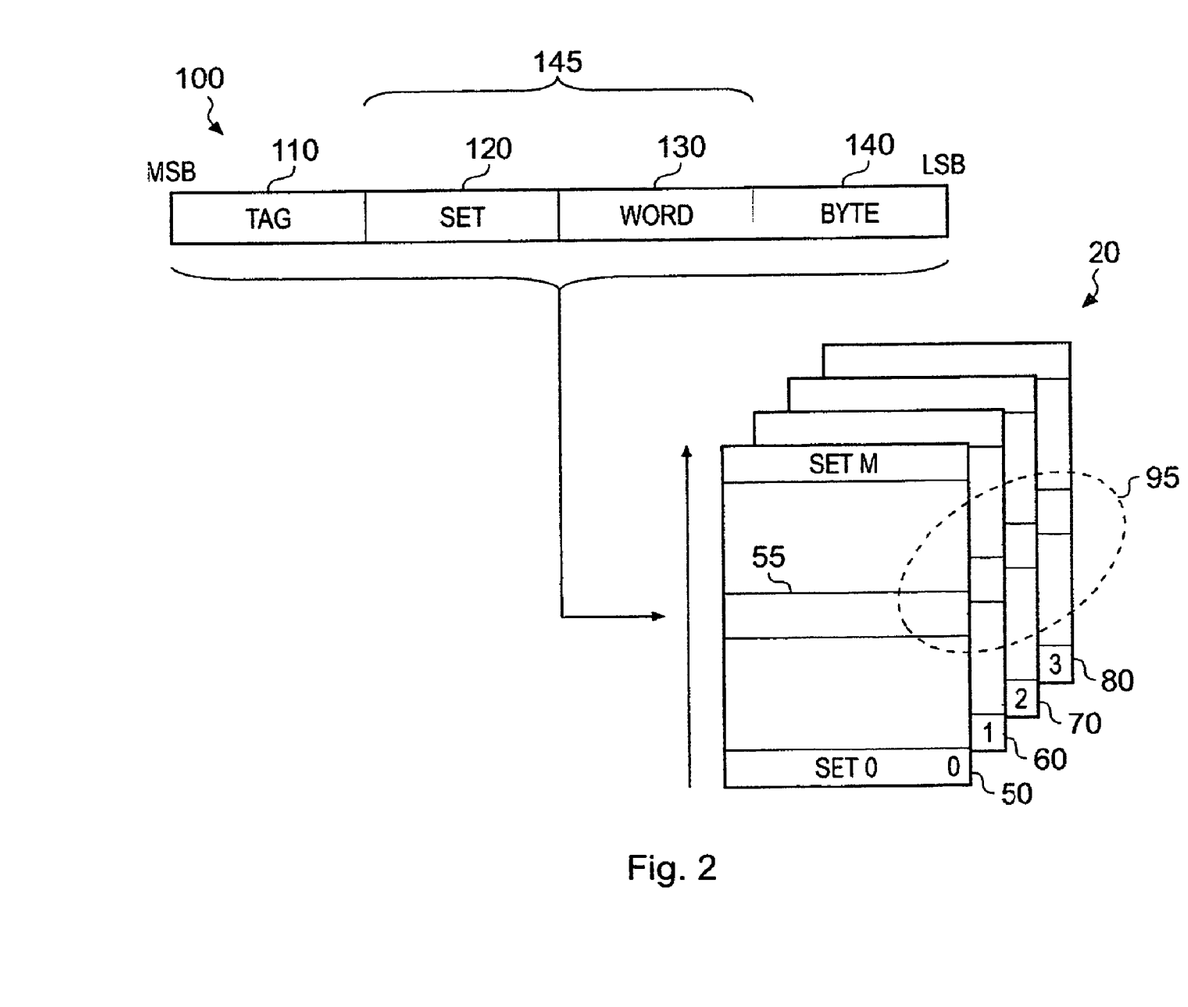
FIG. 2 illustrates an example 4-way set associative cache that may be used within the data processing apparatus of FIG. 1, and illustrates the accessing of that cache dependent upon an address.

The cache 20 is in one embodiment formed as an n-way set associative cache. Such an n-way set associative cache is illustrated in FIG. 2, in particular FIG. 2 showing a 4-way set associative cache. If the cache 20 actually comprises separate instruction and data caches, then both caches may be formed as shown in FIG. 2.

In the example 4-way set associative cache, generally 20, illustrated in FIG. 2, each of the 4 ways 50, 60, 70, 80 contain a number of cache lines 55. A data value (for example a word) associated with a particular address can be stored in a particular cache line of any of the 4 ways (i.e. each set has 4 cache lines, as illustrated generally by reference numeral 95). For an example 16 Kbyte cache, each way stores 4 Kbytes (16 Kbyte cache/4 ways). If each cache line stores eight 32-bit words then there are 32 bytes/cache line (8 words×4 bytes/word) and 128 cache lines in each way ((4 Kbytes/way)/(32 bytes/cache line)). Hence, in this illustrative example, the total number of sets would be equal to 128, i.e. 'M' would be 127.

The contents of a full address 100 are also illustrated in FIG. 2. The full address 100 consists of a TAG portion 110, and SET, WORD and BYTE portions 120, 130 and 140, respectively. The SET portion 120 of the full address 100 is used to identify a particular set within the cache 20. The WORD portion 130 identifies a particular word within the cache line 55 (identified by the SET portion 120) that is the subject of the access by the processor, whilst the BYTE portion 140 allows a particular byte within the word to be specified, if required.

A word stored in the cache 20 may be accessed by specifying the full address 100 of the word and by selecting the way which stores the word (the TAG portion 110 is used to determine in which way the word is stored, as will be described below). A logical address 145 (consisting of the SET portion 120 and WORD portion 130) then specifies the logical address of the word within that way. A word stored in the cache 20 may be overwritten to allow a new word for an address requested by the processor to be stored.

Typically, when storing words in the cache 20, a so-called "linefill" technique is used whereby a complete cache line 55 of, for example, 8 words (32 bytes) will be fetched and stored. Depending on the write strategy adopted for the cache 20 (such as write-back), a complete cache line 55 may also need to be evicted prior to the linefill being performed. Hence, the words to be evicted are firstly read from the cache 20 and then the new words are fetched from main memory 40 and written into the cache 20.

Figure 3:
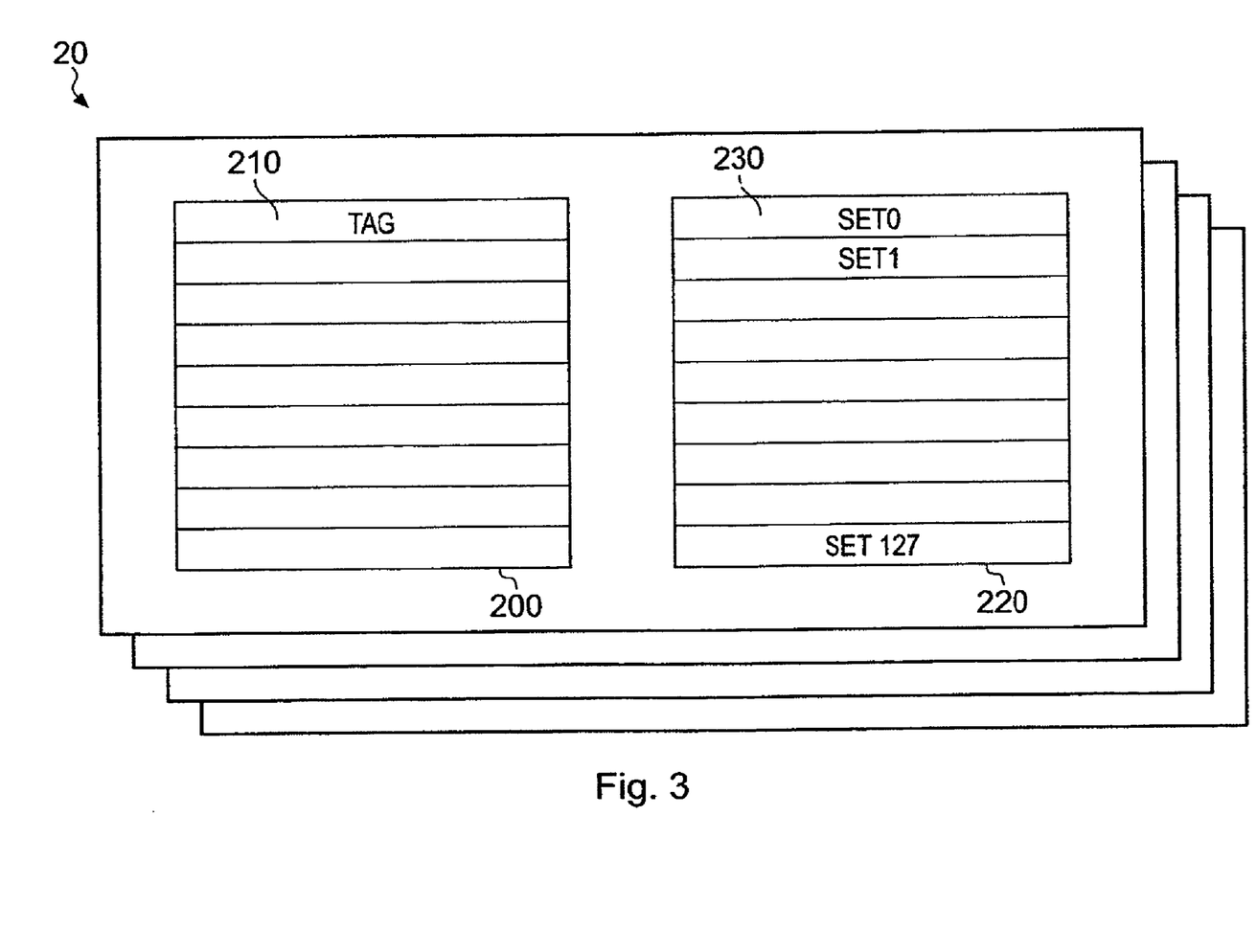
FIG. 3 is a block diagram schematically illustrating the structure of a 4-way set associative cache.

FIG. 3 provides a schematic view of the cache 20, and in particular way 0 of that cache. Each entry 210 in a TAG memory 200 (also referred to herein as a TAG RAM) is associated with a corresponding cache line 230 in a data memory 220 (also referred to herein as a data RAM), each cache line containing a plurality of data values. The cache determines whether the TAG portion 110 of the full address 100 issued by the processor 10 matches the TAG value in one of the TAG entries 210 of the TAG memory 200 of any of the ways. If a match is found then the data value in the corresponding cache line 230 for that way identified by the SET and WORD portions 120, 130 of the full address 100 will be accessed in the cache 20, assuming the cache line is valid.

In addition to the TAG value stored in a TAG entry 210 for each cache line 230, a number of status bits (not shown) are preferably provided for each cache line. Preferably, these status bits are also provided within the TAG memory 200. As an example, a valid bit may be associated with each cache line. As will be appreciated by those skilled in the art, the valid bit is used to indicate whether a data value stored in the corresponding cache line is still considered valid or not. Hence, setting the valid bit will indicate that the corresponding data values are valid, whilst resetting the valid bit will indicate that at least one of the data values is no longer valid.

Further, as will be appreciated by those skilled in the art, if the cache is a data cache (or a unified cache, which is typically treated as a data cache) an additional status bit in the form of a dirty bit is typically used to indicate whether any of the data values stored in the corresponding cache line are more up-to-date than the data value stored in memory 40. Such a dirty bit is not typically used in an instruction cache since an instruction cache will typically only be used to store copies of instructions stored in memory, and the processor core 10 will not write to the instruction cache (i.e. the instruction cache's contents will never become dirty).

The value of the dirty bit is relevant for write back regions of memory 40, where a data value output by the processor core 10 and stored in a data cache is not immediately also passed to the memory 40 for storage, but rather the decision as to whether that data value should be passed to memory 40 is taken at the time that the particular cache line is overwritten, or "evicted", from the cache 20. Accordingly, a dirty bit which is not set will indicate that the data values stored in the corresponding cache line correspond to the data values stored in memory 40, whilst a dirty bit being set will indicate that at least one of the data values stored in the corresponding cache line has been updated, and the updated data value has not yet been passed to the memory 40.

In a typical data cache, when the data values in a cache line are evicted from the cache, they will be output to memory 40 for storage if the valid and dirty bits indicate that the data values are both valid and dirty. If the data values are not valid, or are not dirty, then the data values can be evicted without the requirement to pass the data values back to memory 40. For a typical instruction cache, when the data values in a cache line are evicted from the cache, they will not need to be stored to memory since they will merely be a copy of data values already stored in memory.

Figure 4:
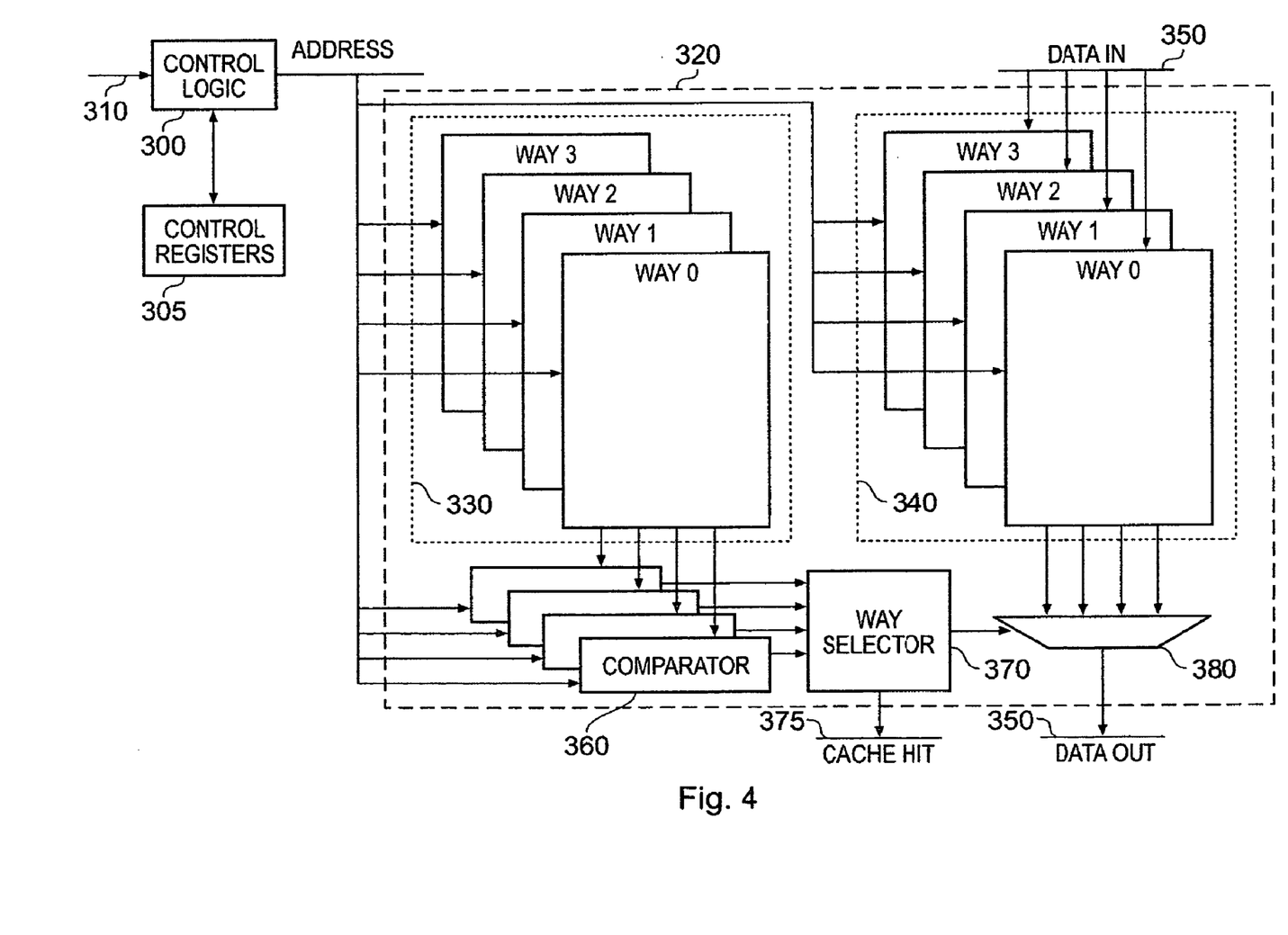
FIG. 4 is a block diagram schematically illustrating the accessing of a 4-way set associative cache based on the address specified by an access request.

FIG. 4 illustrates in more detail the operation within the cache 20 when the processor core 10 requests a data value. The cache 20 comprises of four ways, a comparator 360 associated with each way, a way selector 370 and a multiplexer 380.

As discussed earlier, the cache contains a group 330 of TAG memories 200 (one TAG memory for each way) and a group 340 of data memories 220 (one data memory for each way). When an access request is issued by the processor 10, the address for the data value to be accessed is placed on the processor address bus 310. The address is received by control logic 300 of the cache 20 from the processor address bus 310. For a non-sequential access, the control logic causes the TAG memory 200 and data memory 220 in each way to receive the address. Each TAG memory 200 in the group 330 outputs the TAG value stored at the location specified by SET portion 120 of the address 100 to the associated comparator 360. If the access request is a read access, each data memory 220 of the group 340 also outputs the data value stored at the location specified by the SET portion 120, WORD portion 130 and BYTE portion 140 of the address 100 to the multiplexer 380. Each comparator 360 then compares the TAG value output from the associated way with the TAG portion 110 of the address 100 placed on the processor address bus 310.

If the TAG value and TAG portion 110 match then a signal is sent to the way selector 370. The way selector 370 then indicates a cache hit on path 375. For a read access, the way selector 370 also outputs a select signal to multiplexer 380 identifying the way in which the hit was detected. The multiplexer 380 then selects and outputs the corresponding data value onto the processor data bus 350. Hence, the processor core 10 is provided with the data value directly from the cache 20.

If the TAG value and TAG portion 110 do not match then no signal is sent to the way selector 370. The way selector 370 then indicates a cache miss by supplying an appropriate signal on path 375. This will cause a linefill process to take place in which a number of data values (including the required data value) constituting a cache line are retrieved from memory 40 and stored within the cache 20. Thereafter there will be a hit in the cache 20, and accordingly the access request can then be completed using the data value stored in the cache.

For an instruction cache, as mentioned earlier, the processor will not issue any write access requests to that cache. However, if the cache is a data cache, then the access request may be a write access request. For a write access, then if any of the comparators 360 determine that the TAG value and TAG portion 110 match, a signal is sent to the way selector 370. The way selector 370 then indicates a cache hit on path 375. In addition, the way selector issues a control signal to the data memory 220 of the way in which the hit was detected in order to cause that data memory to store the data value being provided on the data in bus 350 in the cache line location identified by the SET, WORD and BYTE portions of the address 100.

Control registers 305 are provided within the cache 20 for storing a number of cache control attributes. One of the control registers is a global current way register, which indicates the hit way of the last lookup performed within the cache. A second of the control registers 305 is a global current TAG register, which indicates the TAG value of the last lookup performed within the cache.

As each access request is issued by the processor core 10, the control logic 300 within the cache 20 is arranged to receive the address provided by that access request and determine, with reference to the contents of the control register 305, which of the TAG memories and/or data memories should be the subject of the lookup. A lookup for a non-sequential access has been described above with reference to FIG. 4. For a sequential access, the control logic will determine a subset of the TAG memories and data memories to be subjected to the lookup process, as will be discussed in more detail later with reference to FIG. 6.

Figure 5:
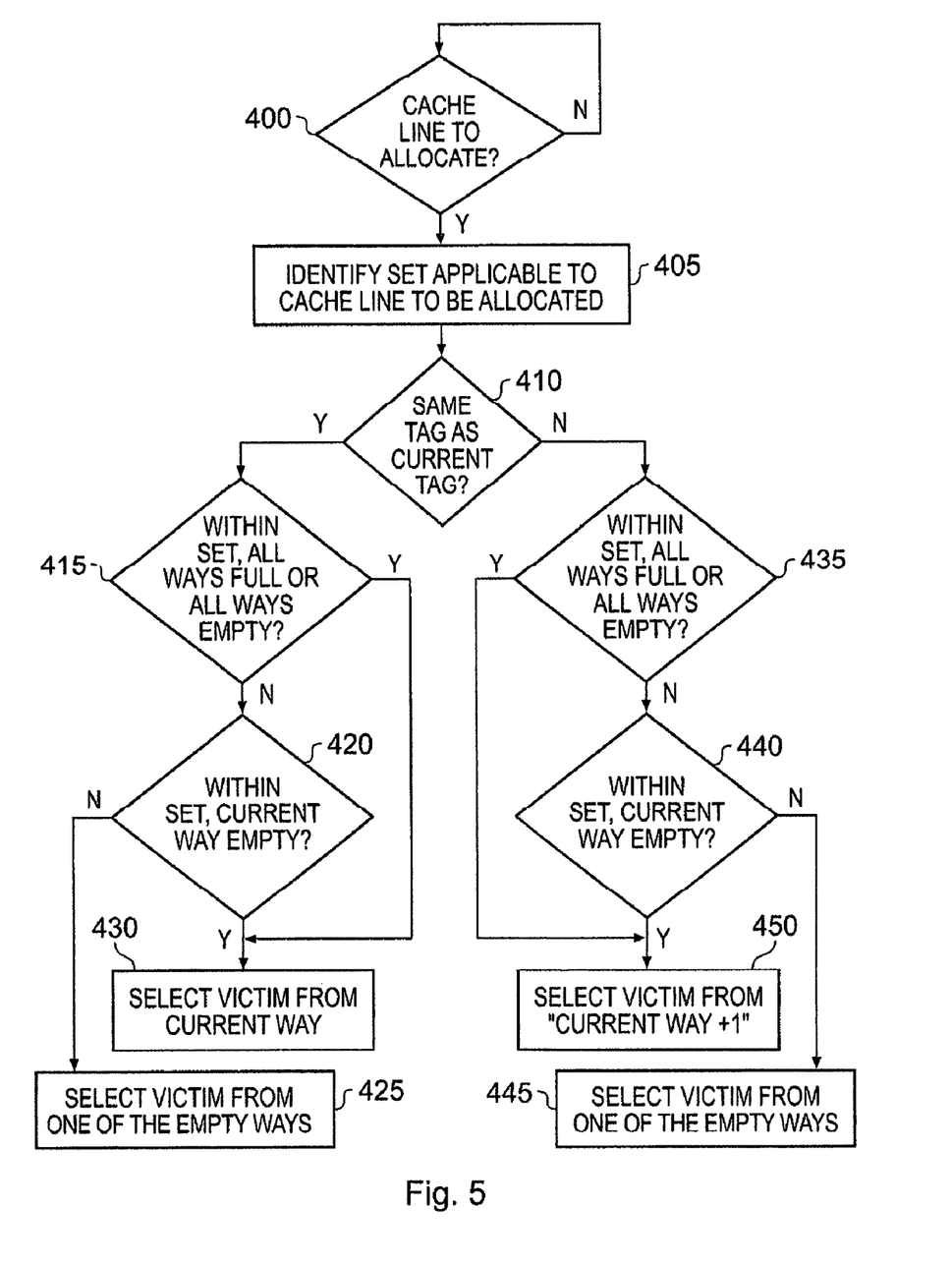
FIG. 5 is a flow diagram illustrating a cache allocation sequence in accordance with one embodiment.

FIG. 5 is a flow diagram illustrating the process performed when allocating a cache line to the cache in accordance with one example embodiment. At step 400, it is determined whether there is a cache line to be allocated into the cache. As discussed earlier, this will typically occur as the result of a linefill operation taking place, in which a plurality of data values form main memory 40 are provided for allocating to a particular cache line in the cache 20. When it is determined at step 400 that there is a cache line to allocate then at step 405 a determination of the set applicable to the cache line to be allocated is made. This is done with reference to the set portion 120 of the addresses associated with the data values of that cache line. All of the data values in a particular cache line will have the same TAG portion 110 and set portion 120.

Then, at step 410 it is determined whether the TAG portion associated with the data values of the cache line to be allocated is the same as the current TAG value stored within the global current TAG register (as mentioned earlier this being one of the control registers 305). If the TAGs are the same then at step 415 it is determined for the particular set in question whether all ways are full or all ways are empty i.e. whether the cache lines forming that set all contain valid data, or all contain invalid data. If this is the case, then the process proceeds directly to step 430, where a victim cache line is selected from the current way, as indicated by the global current way register (as mentioned earlier this register being one of the control registers 305). The selected victim cache line will then be evicted from the cache 20 (which for a data cache or unified cache will involve the cache line being written back to the memory 40 if the cache line is valid and dirty—for an instruction cache it will not be necessary to write the cache line back to memory 40), to make space for the cache line identified at step 400 to be allocated into the cache.

If at step 415 it is determined that for the particular set in question not all of the ways are full or not all of the ways are empty then at step 420 it is determined whether the current way is empty. If so, then the process proceeds to step 430 where the victim cache line is selected form the current way, whereas if this is not the case the process proceeds to step 425 where the victim cache line is selected form one of the empty ways. If there is more than one empty way, then in one embodiment the victim cache line is selected from the first empty way, starting with way 0. However, it will be appreciated that other rules could be used for determining at step 425 the empty way from which the victim cache line should be selected.

If at step 410 it is determined that the TAG portion associated with the data values of the cache line to be allocated is not the same as the current TAG value held in the global current TAG register, then the process branches to step 435 where it is determined for the particular set in question whether all ways are full or all ways are empty. If so, then the process branches to step 450 where the victim cache line is selected from the next way i.e. the way having the number "current way +1". Hence, by way of example, if the current way is way 1, then at step 450 the victim cache line will be selected from way 2.

If at step 435 it is determined that for the particular set in question that not all ways are full or not all ways are empty, then at step 440 is it determined whether the current way is empty. If so, the process proceeds to step 450 where the victim cache line is selected from the next way, whereas otherwise the process proceeds to step 445, where the victim cache line is selected from one of the empty ways. In an analogous way to step 425, in one embodiment the victim cache line is selected from the first empty way, starting with way 0.

Figure 6:
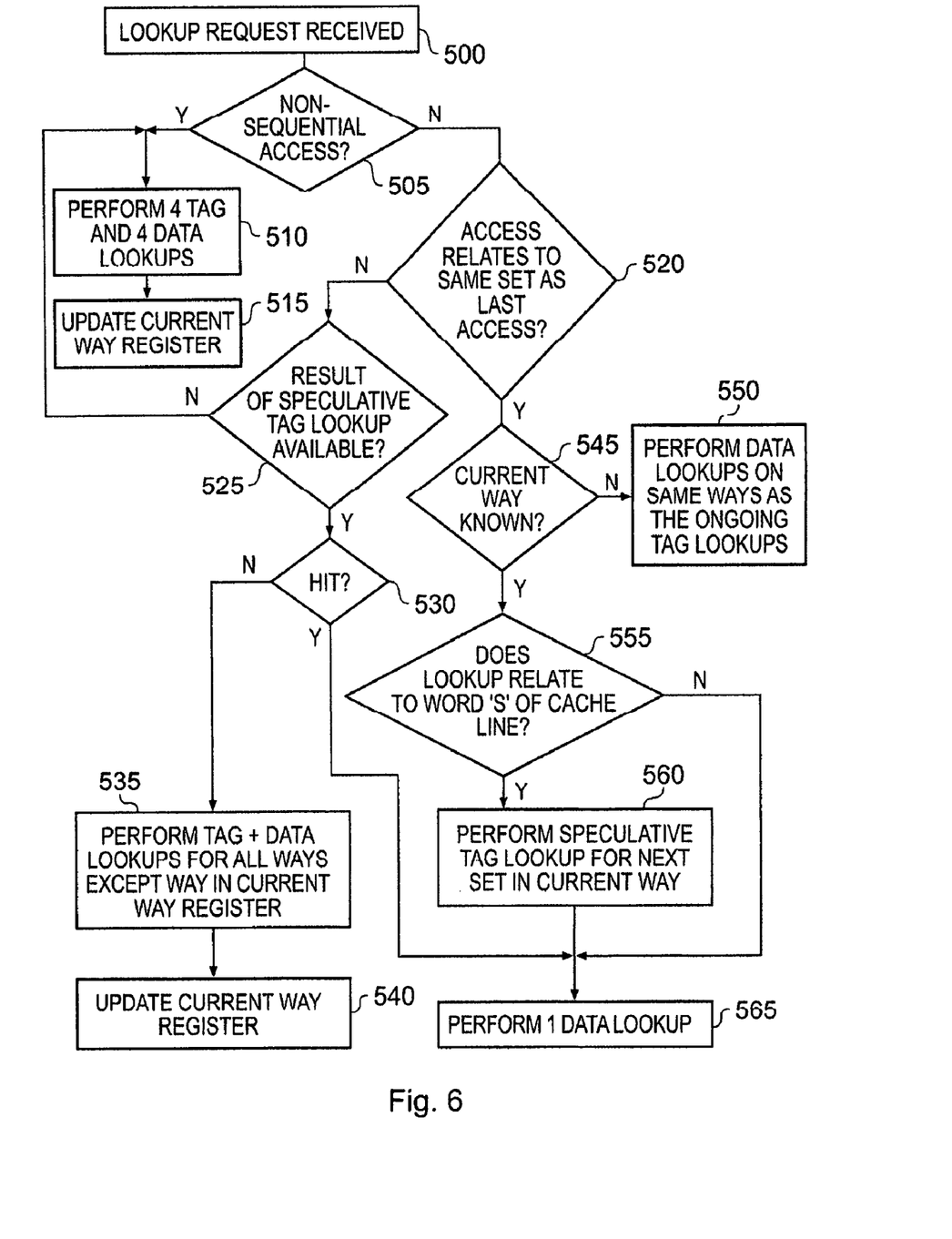
FIG. 6 is a flow diagram illustrating a sequence of steps employed in order to access a cache in accordance with one embodiment.

FIG. 6 is a flow diagram illustrating the steps performed within the cache in accordance with one example embodiment to perform a lookup in response to an access request. At step 500, a lookup request is received whereafter at step 505, it is determined whether the access is a non-sequential access. If the access is a non-sequential access then the process proceeds to step 510, where a lookup takes place within all of the TAG RAMs and all of the data RAMs, in this case four TAG RAMs and four data RAMs, assuming a 4-way set associative cache. Thereafter, at step 515, the global current way register is updated to reflect the results of the lookup performed at step 510.

It should be noted that if a cache miss occurs at step 510, then the required data value is retrieved from memory 40 into the cache 20, so that there will then be a hit within the cache. Accordingly, there will always ultimately be a hit within the cache and accordingly the current way register can be updated at step 515 to identify the hit way associated with the lookup performed at step 510.

If at step 505 it is determined that the access is not a non-sequential access (i.e. it is a sequential access), then the process proceeds to step 520 where it is determined whether the access relates to the same set as the last access performed. This can readily be determined by evaluating whether the word portion 130 of the address is non-zero. If the access is determined not to relate to the same set as the last access, then the process branches to step 525, where it is determined whether the result of a speculative TAG lookup is available. In preferred example embodiments, as will be discussed later with reference to the tables of FIGS. 7B and 7C, the speculative TAG lookup is performed when a sequential access is accessing the penultimate data value of a particular cache line, and is arranged using an incremented version of the current set value as an index into the cache, to perform a lookup in the TAG memory of the current way as indicated by the global current way register in order to determine whether the TAG value held in that TAG memory is the same as the current TAG value stored in the global current TAG register. If so, this indicates that any further sequential access crossing a cache line boundary will still produce a hit in the current way, and accordingly can be handled as a standard sequential access by the cache.

If the result of the speculative TAG lookup is not available at step 525, then the cache has to treat the current access as a non-sequential access and accordingly the process branches to step 510, followed by step 515. However, assuming that the result of the speculative TAG lookup is available, which should typically be the case provided that the time at which the speculative TAG lookup was initiated took into account the TAG RAM latency, then at step 530 it is determined whether the speculative TAG lookup produced a hit, i.e. whether it was determined that the TAG value held in the next cache line of the current way is the same as the current TAG value. If so, then as mentioned earlier the access can be treated as a true sequential access, and accordingly the process proceeds directly to process 565 where a single lookup is performed in the data RAM of the current way. However, if no hit is determined at step 530 then at step 535 lookups are performed in the TAG RAMs and data RAMs of all ways except for the way identified in the global current way register. A lookup is not required in that way, since a hit within that way has already been excluded by the results of the speculative TAG lookup performed earlier. Following step 535, the current way register is updated at step 540 to reflect the results of the lookup performed at step 535. As with step 510, step 535 will always ultimately produce a hit within the cache, and so the current way register can accordingly be updated appropriately at step 540.

If at step 520, it is determined that the access does relate to the same set as the last access then it is determined at step 545 whether the current way is known. The current way will typically be known, but this is not always the case. For example, if the last access was a non-sequential access, and assuming the TAG RAMs have a latency of more than one cycle, then the current way may not be known at the time the current access is being handled. As another example, if the result of the speculative TAG lookup did not produce a hit, it will then have been necessary to initiate TAG lookups in all ways except the way identified in the current way register (see step 535), and due to the TAG RAM latency the results of this further lookup process may not be known at the time the current access is being handled. In the event that the current way is not known, then the process branches to step 550 where a data lookup is performed in each of the ways the subject of the ongoing TAG lookup process.

However, assuming that the current way is known at step 545, then it is determined at step 555 whether the lookup relates to word "S" of the cache line. Word S of the cache line is the word that causes the speculative lookup to be triggered, and given that the results of the speculative lookup are required by the time a sequential access crossing a cache line is processed by the cache, then it is important that the particular word location in the cache line chosen as word S is selected having regard to the TAG RAM latency. Assuming the TAG RAM latency is two cycles, then word S will be chosen to be the penultimate word of the cache line.

If the lookup does not relate to word S of the cache line, then the process proceeds directly to step 565, where a lookup is performed in a single data RAM, namely the data RAM of the current way. However, if the lookup does relate to word S, then the process proceeds to step 560 where the speculative TAG lookup is performed for the next set in the current way. Also, at step 565, a data lookup is performed in the data RAM of the current way to complete processing of the current access request.

Whilst steps 560 and 565 have been shown as sequential steps in FIG. 6, in one embodiment of the present invention steps 560 and 565 are performed in parallel.

Figure 7A:
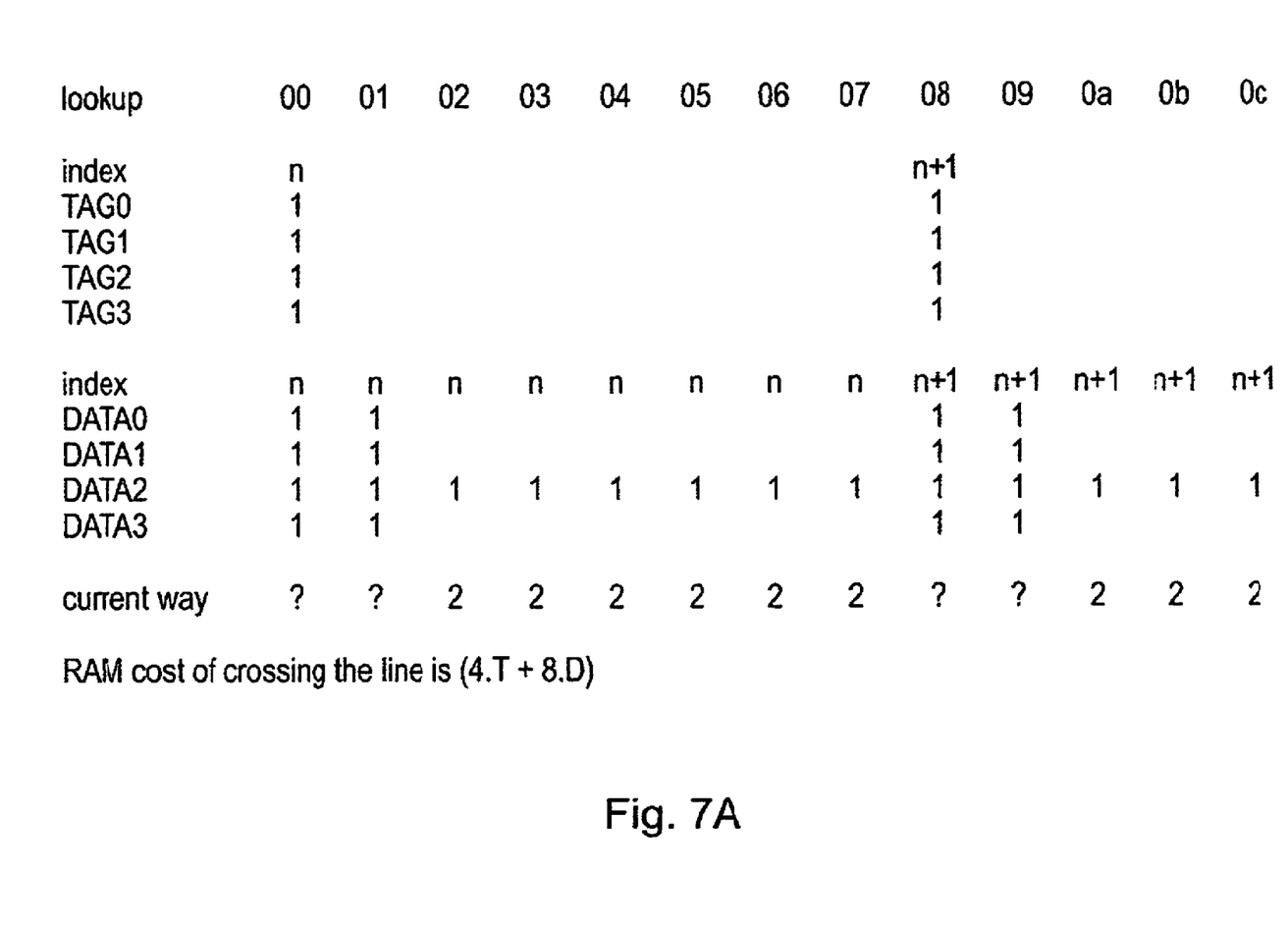
FIG. 7A is a table illustrating cache access behavior in accordance with a known technique.

FIG. 7A is a table illustrating the handling of accesses in accordance with a known technique, where any access crossing a cache line is treated as a non-sequential access when performing the cache lookup. In FIG. 7A and indeed in the FIGS. 7B and 7C to be discussed later, it is assumed that the cache is a 4-way set associative cache with 8 words per cache line, and that the TAG RAM latency is two cycles. The first access is treated as a non-sequential access, and accordingly 4 TAG RAM lookups and 4 data RAM lookups are performed. At this point the current way is not known. The next access is a sequential access, seeking to access the second word in the cache line (Word 01) but since the current way is not known then 4 data RAM lookups are required. For the following sequential accesses to the remaining words of the cache line, the current way is known (i.e. the results of the 4 TAG lookups performed for the first non-sequential access are now available), and accordingly a single data RAM lookup is required for each sequential access.

However, for the eighth sequential access following the original non-sequential access, this now relates to the next set (set n+1) and accordingly has crossed a cache line boundary. Hence, as discussed earlier, this standard approach needs to treat such an access as a non-sequential access, and accordingly will again perform four data RAM lookups and four TAG RAM lookups, using as an index into the cache the value n+1. The sequence then repeats itself. In the particular example illustrated in 7A it turns out that the required data continues to be accessible in way 2, this being confirmed by the time the lookup 0a is performed. As can be seen from FIG. 7A, the power cost associated with the need to treat the sequential access crossing the cache line boundary as a non-sequential access is 4T+8D, where T is the power consumption for a TAG RAM lookup and D is the power consumption for a data RAM lookup.

Figure 7B:
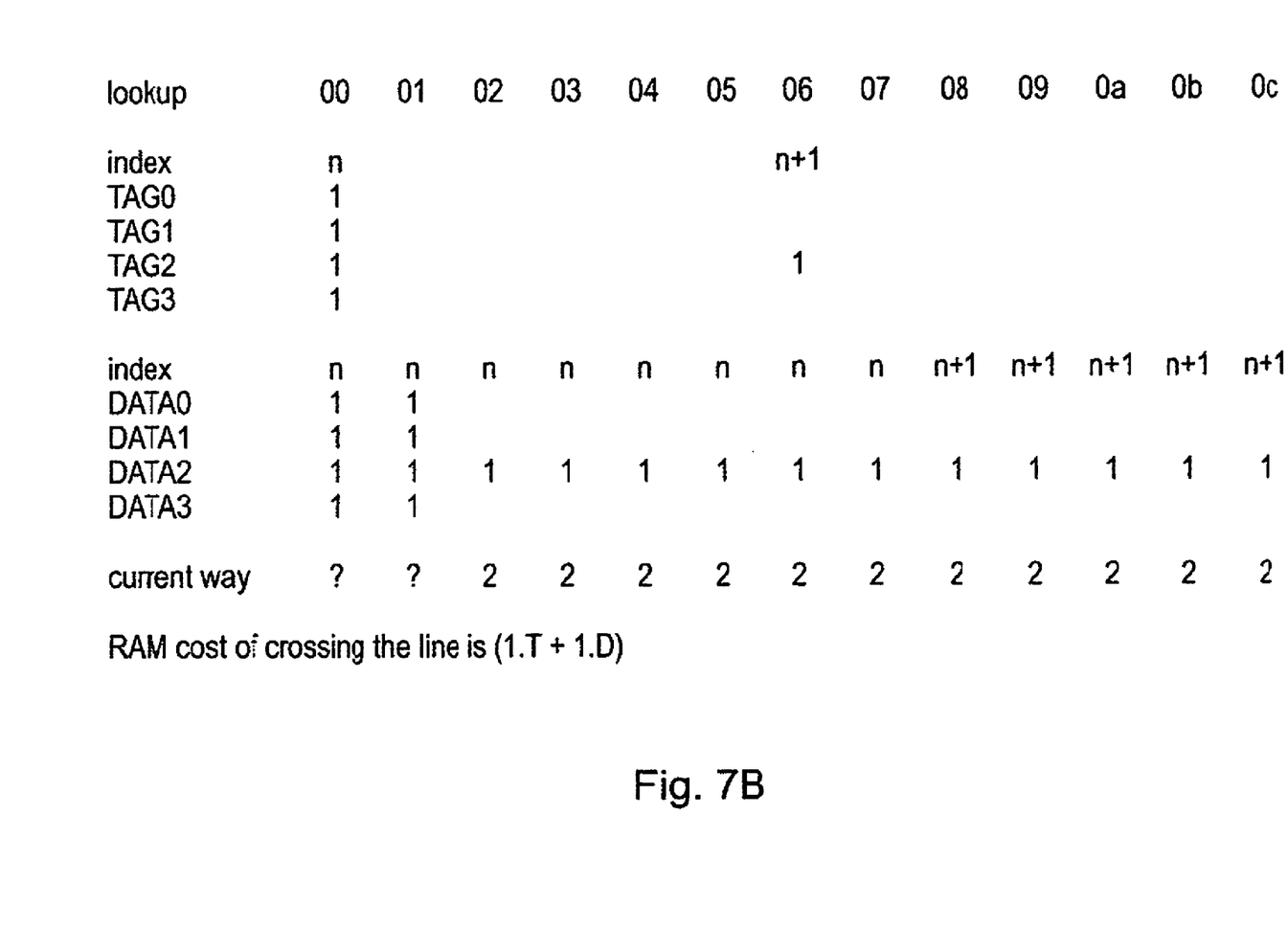
FIGS. 7B and 7C are tables illustrating cache access behavior in accordance with the technique of one embodiment.

FIG. 7B illustrates the same sequence of accesses, but when employing the technique of one example embodiment. Again the initial lookup is performed as a non-sequential lookup, and when performing the second lookup, 4 data RAM lookups are required since the current way is not known (see step 550 of FIG. 6). Thereafter, a single data RAM lookup in way 2 is all that is required for each of the sequential accesses in the rest of the cache line (set n). However, when the penultimate data word in the cache line is reached (lookup 06) then, in addition to performing the single data RAM lookup required for that access, a speculative TAG lookup is performed in TAG RAM 2 using the index n+1 in order to determine whether the TAG value held in that TAG RAM at that index location is the same as the current TAG. The result of this TAG RAM lookup becomes available by the beginning of the lookup 08, and in this case the speculative lookup produces a hit. Accordingly each of the sequential accesses starting with lookup 08 can continue to be handled using only a single data RAM lookup in the data RAM 2, but now using the index n+1. Accordingly, it can be seen that the power cost associated with handling a sequential access crossing a cache line is 1T+1D.

Figure 7C:
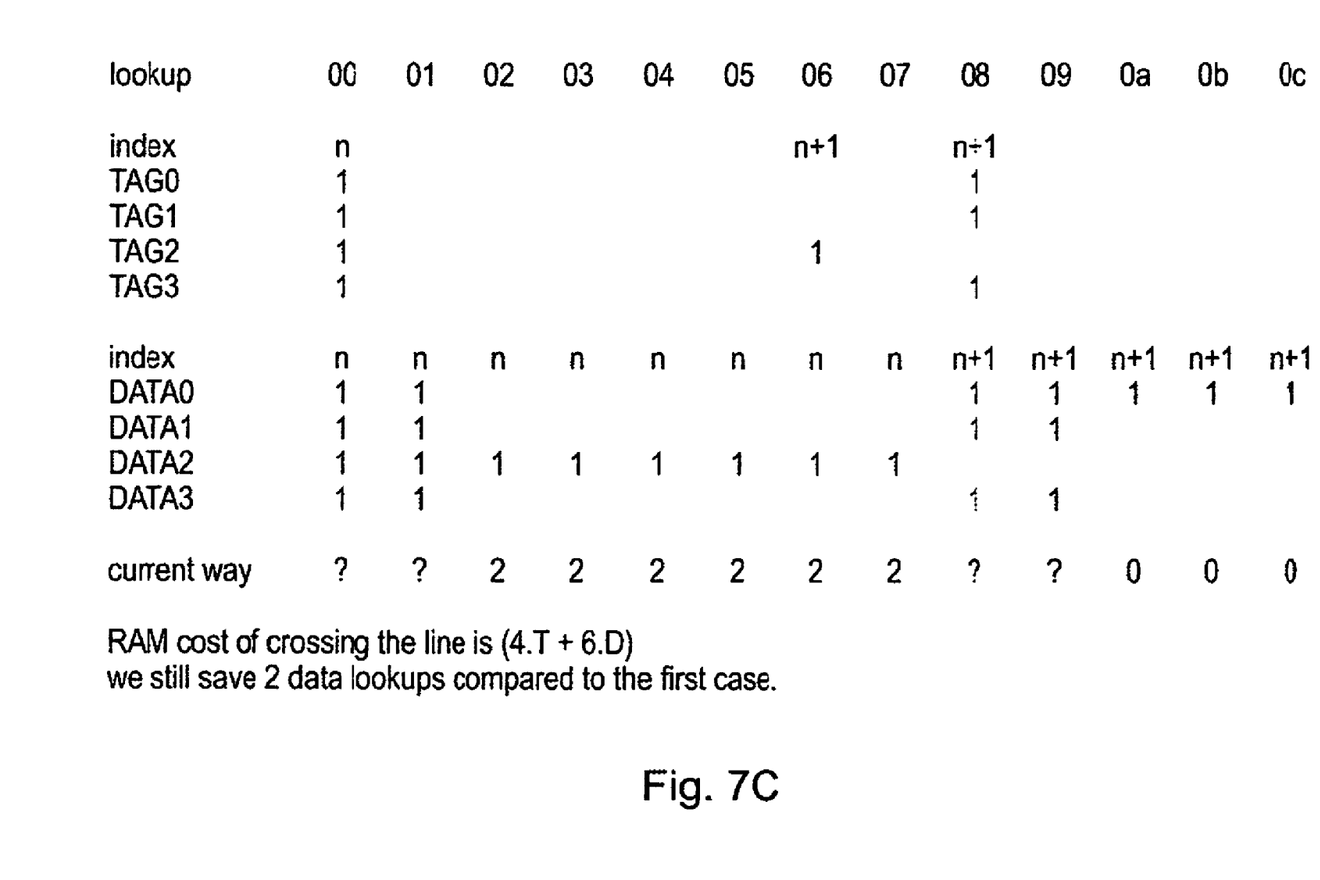

FIG. 7C is a table illustrating the situation that arises if a hit does not result from the speculative lookup. As can be seen, lookups 00 to 07 are the same as those discussed earlier with reference to FIG. 7B, and again the speculative lookup is triggered on lookup 06. However, the result of the speculative lookup is not a hit, i.e. it is determined that the TAG value at index n+1 in TAG RAM 2 is not the same as the current TAG value. Accordingly, this means that the data value seeking to be accessed on lookup 08 is not present in way 2 of the cache. However, it is not known in which way the data value to be accessed is present. Accordingly, for lookup 08, it is necessary to perform 3 TAG RAM lookups and 3 data RAM lookups, i.e. to perform a lookup in each of the ways other than the current way (see step 535 of FIG. 6). When performing lookup 09, the results of the TAG RAM lookup performed for lookup 08 will not yet be available, and accordingly again it will be necessary to perform 3 data RAM lookups (see step 550 of FIG. 6).

By lookup 0a, the result of the TAG RAM lookup performed for lookup 08 has become available, and indicates that the cache line containing the required data values is in way 0. Accordingly, at this point it is only necessary to perform a single data RAM lookup in way 0. From FIG. 7C, it will be seen that the power cost when performing a lookup for a sequential access crossing a cache line where the data is held in a different way to the current way is 4T+6D. It should be noted that this still saves two data RAM lookups compared to the traditional prior art case discussed earlier with reference to FIG. 7A.

Accordingly, it can be seen that the techniques of the example embodiments provide a particularly power efficient technique for handling cache accesses in a data processing apparatus. The speculative lookup enables significant power savings to be realised, these power savings being particularly enhanced when also adopting a cache allocation policy that seeks to allocate data values having the same TAG value to cache lines in a single way of the cache.

The cache may be used to store data processed by the processor, or instructions to be executed on the processor. The technique can be used with either a unified cache, a data cache or an instruction cache. However, it has been found that particularly significant power savings are achieved when employed in association with an instruction cache, due to the nature of lookups in such an instruction cache. In particular, lookups in an instruction cache are widely sequential, due to the processor executing a generally sequential instruction stream. Further, the lookups are usually local due to the processor executing loops of instructions. Hence, for an instruction cache, the techniques of embodiments of the present invention produce a significant reduction in the number of sequential accesses that need to be managed as non-sequential accesses.

Although particular example embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:

a processing unit configured to issue a series of access requests, each access request having associated therewith an address of a data value to be accessed;

an n-way set associative cache memory configured to store data values for access by the processing unit, each way of the cache memory comprising a plurality of cache lines, each cache line being configured to store a plurality of data values, the cache memory further comprising for each way a tag storage configured to store, for each cache line of that way, a corresponding tag value, the tag value being derived from a portion of the address common to each data value held in that cache line;

the cache memory being configured, when the processing unit is issuing access requests specifying data values held sequentially in a cache line of a current way of the cache memory, to perform a speculative lookup in at least one tag storage to determine whether the tag value associated with a next cache line in one way associated with the at least one tag storage equals an expected tag value;

if that tag value does equal the expected tag value, and following an access request identifying a last data value in said cache line of said current way, a further access request is issued identifying the next cache line, then the cache memory is configured, without further reference to the tag storages of the cache memory, to access from that next cache line of said one way the data value the subject of the further access request.

2. A data processing apparatus as claimed in claim 1, wherein:

the cache memory is configured to perform the speculative lookup in one tag storage, that tag storage being associated with the current way, in order to determine whether the tag value associated with a next cache line in the current way equals the expected tag value;

if that tag value does equal the expected tag value, and following an access request identifying a last data value in said cache line of said current way, a further access request is issued identifying the next cache line, then the cache memory is configured, without further reference to the tag storages of the cache memory, to access from that next cache line of said current way the data value the subject of the further access request.

3. A data processing apparatus as claimed in claim 1, wherein the cache memory is configured to perform said speculative lookup at the time a sequential access is made to a data value at a predetermined location within said cache line of said current way.

4. A data processing apparatus as claimed in claim 3, wherein the predetermined location is the location of the penultimate data value of said cache line.

5. A data processing apparatus as claimed in claim 2, wherein if on performing the speculative lookup it is determined that the tag value associated with a next cache line in said current way does not equal the expected tag value, and if following an access request identifying a last data value in said cache line of said current way, a further access request is issued identifying the next cache line, then the cache memory is configured to process the further access request by determining whether the data value the subject of the further access request is in one of the ways of the cache memory other than said current way.

6. A data processing apparatus as claimed in claim 1, wherein the cache memory is configured to adopt a cache allocation policy that seeks to allocate data values having the same tag value to cache lines in a single way of the cache memory.

7. A data processing apparatus as claimed in claim 6, wherein each set of the cache memory comprises one cache line from each way, for each address there being one set in the cache memory within which the associated data value may reside, the cache allocation policy adopted by the cache memory being configured to seek to allocate data values having the same tag value and relating to different sets to related cache lines in said single way of the cache memory.

8. A data processing apparatus as claimed in claim 6, wherein the cache allocation policy adopted by the cache memory is configured to seek to allocate data values having different tag values to cache lines in different ways of the cache memory.

9. A data processing apparatus as claimed in claim 1, wherein the cache is an instruction cache, and each data value represents an instruction.

10. A data processing apparatus comprising:
processing means for issuing a series of access requests, each access request having associated therewith an address of a data value to be accessed;
n-way set associative cache means for storing data values for access by the processing means, each way of the cache means comprising a plurality of cache lines, each cache line for storing a plurality of data values, the cache means further comprising for each way a tag storage means for storing, for each cache line of that way, a corresponding tag value, the tag value being derived from a portion of the address common to each data value held in that cache line;
the cache means being arranged, when the processing means is issuing access requests specifying data values held sequentially in a cache line of a current way of the cache means, to perform a speculative lookup in at least one tag storage means to determine whether the tag value associated with a next cache line in one way associated with the at least one tag storage means equals an expected tag value;
if that tag value does equal the expected tag value, and following an access request identifying a last data value in said cache line of said current way, a further access request is issued identifying the next cache line, then the cache means is arranged, without further reference to the tag storage means of the cache means, to access from that next cache line of said one way the data value the subject of the further access request.

11. A method of handling cache accesses in a data processing apparatus, the data processing apparatus comprising a processing unit configured to issue a series of access requests, each access request having associated therewith an address of a data value to be accessed, and an n-way set associative cache memory configured to store data values for access by the processing unit, each way of the cache memory comprising a plurality of cache lines, each cache line being configured to store a plurality of data values, the cache memory further comprising for each way a tag storage configured to store, for each cache line of that way, a corresponding tag value, the tag value being derived from a portion of the address common to each data value held in that cache line, the method comprising the steps of:
when the processing unit is issuing access requests specifying data values held sequentially in a cache line of a current way of the cache memory, performing a speculative lookup in at least one tag storage to determine whether the tag value associated with a next cache line in one way associated with the at least one tag storage equals an expected tag value;
if that tag value does equal the expected tag value, and following an access request identifying a last data value in said cache line of said current way, a further access request is issued identifying the next cache line, then, without further reference to the tag storages of the cache memory, accessing from that next cache line of said one way the data value the subject of the further access request.

* * * * *